Figure 1:
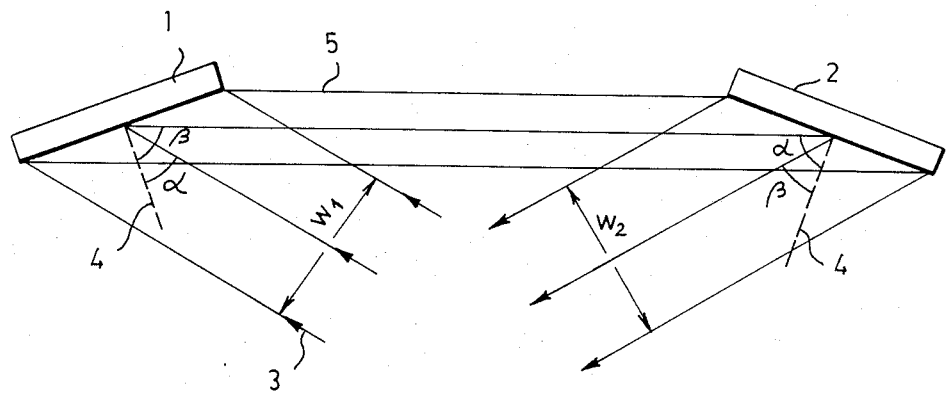

United States Patent [19]

Lindblom et al.

[11] Patent Number: 4,684,253
[45] Date of Patent: Aug. 4, 1987

[54] APPARATUS FOR CARRYING OUT SPECTRAL ANALYSIS

[75] Inventors: Karl P. C. Lindblom; Sonja A. Engman, both of Turku, Finland

[73] Assignee: Scanoptics Oy, Espoo, Finland

[21] Appl. No.: 570,930

[22] PCT Filed: May 10, 1983

[86] PCT No.: PCT/FI83/00040

§ 371 Date: Jan. 3, 1984

§ 102(e) Date: Jan. 3, 1984

[87] PCT Pub. No.: WO83/04093

PCT Pub. Date: Nov. 24, 1983

[30] Foreign Application Priority Data

May 11, 1982 [FI] Finland ................................. 821661

[51] Int. Cl.$^4$ ............................ G01J 3/14; G01J 3/18
[52] U.S. Cl. ..................................... 356/333; 356/334
[58] Field of Search ............... 356/305, 308, 328, 331, 356/333, 334

[56] References Cited

U.S. PATENT DOCUMENTS

| 2,945,953 | 7/1960 | Martin | 356/334 |
| 3,098,408 | 7/1963 | Cary | 356/333 |
| 3,373,651 | 3/1968 | Mack et al. | 356/346 |
| 3,888,590 | 6/1975 | White | 356/333 |
| 3,922,089 | 11/1975 | Danielsson et al. | 356/305 |
| 4,455,087 | 6/1984 | Allemand et al. | 356/333 |

OTHER PUBLICATIONS

Braund et al., *Appl. Optics*, V. 19, N. 13, 7/1/80, p. 2146.
Murty, *Appl. Optics*, V. 11, N. 10, 10/72, p. 2286.

*Primary Examiner*—F. L. Evans
*Attorney, Agent, or Firm*—Ladas & Parry

[57] ABSTRACT

The invention relates to an apparatus for carrying out spectral analysis which is provided with diffraction grating means (1–6, 12–15) for dispersing the incident radiation (3). In order to achieve a high spectral resolution in an economically advantageous manner, the diffraction grating means comprises a plurality of grating surfaces (1–6, 12–15) which are arranged so that the radiation (3), after diffraction from the first grating surface (1, 12), is subject to diffraction also in the other grating surfaces (2–6, 13–15). The grating surfaces hereby have such an orientation that the wavelength dispersion at diffraction from one grating surface acts to increase the wavelength dispersion at diffraction from the following grating surfaces.

4 Claims, 3 Drawing Figures

APPARATUS FOR CARRYING OUT SPECTRAL ANALYSIS

The present invention relates to an apparatus for carrying out spectral analysis comprising means for leading the radiation into the apparatus, means for recording the produced spectrum and diffraction grating means for dispersing the incident radiation.

It is previously known to use in spectral analysis so-called diffraction gratings as wavelength dispersing optical means for dividing optical radiation into wavelength components. These gratings therefore are commonly included in spectral apparatuses which, in addition to the grating, usually have an entrance slit through which the optical radiation to be analyzed is admitted to the apparatus, whereafter the diffraction grating together with other optical means produces an image of the entrance slit on a focal plane so that optical radiation of different wavelengths is reproduced in different locations on said plane. The recording of the spectrum, i.e. the measurement of the intensity of the different wavelength components is usually carried out photoelectrically. Spectral instruments provided with photoelectric recording are usually called spectrometers. In certain types of spectrometers a slit, a so-called secondary slit, is used also in the focal plane behind which a photoelectric detector is positioned. The recording of the spectrum then takes place so that by rotating, for example, the grating the different wavelength components are made to pass the slit sequentially and are recorded by the detector. A spectrometer of this kind is called monochormator. Spectrometers provided with several secondary slits and detectors are analogically called polychromators.

An important property in a spectral apparatus is its spectral resolution which is a measure of how close to each other two wavelength components can be located so that they can barely be distinguished in the apparatus. Another important characteristic is the so-called dispersion which can be described in two ways, viz. either as angular or as linear. The wavelength dispersing properties of a diffraction grating are determined by the so-called grating equation reading as follows $$\frac{m\lambda}{d} = n(\sin\alpha + \sin\beta) \quad (1)$$

Therein the quantity $\alpha$ denotes the so-called angle of incidence, i.e. the angle which the optical radiation incident on the grating forms with the normal to the grating surface, hereinafter called grating normal. The quantity $\beta$ analogically denotes the angle which the outgoing optical radiation forms with the grating normal after diffraction in the grating surface. The quantity $\lambda$ denotes the wavelength of the optical radiation, the quantity d the distance between the grooves in the grating surface, and m the so-called spectral order. This is an integer implying that the same wavelength can be dispersed through diffraction in different well-defined diffraction angles corresponding to different values of the integer m. In the same spectral order different wavelength components give rise to diffraction at different diffraction angles $\beta$. In the equation (1) n indicates the refractive index of the gas which surrounds the grating surface. This has approximately the value 1 when the grating surface is surrounded by air at normal air pressure.

By differentiating the equation (1) the expression (n=1) is obtained $$\frac{d\beta}{d\lambda} = \frac{m}{d\cos\beta} \quad (2)$$

The quantity $d\beta/d\lambda$ indicates the change in the diffraction angle per change in wavelength caused by the grating. This quantity is called the angular dispersion.

A measure of what a grating can resolve is obtained in the following manner. With a perfect optical image of a very narrow entrance slit in the focal plane, the width of the image will be mainly determined by the diffraction in the often rectangular aperture that the grating or the focusing optical means defines. Using a diffraction grating, the width of this aperture is given by the expression $W \cos \beta$, wherein the quantity W denotes the width of the grating. It is known that a criterion of which angle change $d\beta$ thereby barely can be distinguished is $d\beta = \lambda/W \cos \beta$. The smallest wavelength difference $d\lambda$ of two wavelengths which are barely resolvable corresponding to this angle change can be obtained from the expression (2). One obtains $$\frac{\lambda}{d\lambda} = m \cdot \frac{W}{d} \quad (3)$$

The quotient W/d is the total number of grooves on the grating surface which is denoted by N. The expression (3) can then be rewritten as $$R = \frac{\lambda}{d\lambda} = mN \quad (4)$$

The quantity R is called spectral resolution, and the above expression shows that the maximum spectral resolution that can be obtained by means of a diffraction grating is determined by the product of the spectral order of the spectrum and the total number of grooves on the grating surface.

Thereby it becomes evident that if one wishes to increase the resolution when recording a spectrum in a specific spectral order, this can be achieved only by increasing the number of grooves on the grating surface which means that also the width of the grating will be increased.

Thus, in order to achieve a high resolution, the technique has been developed to rule gratings for spectral analysis so that gratings of a great width can be produced. The extremely high requirements partly on the precision of the groove distance d and partly on the shape of the grooves imply that the production of wide gratings is very difficult and, consequently, wide gratings are very expensive. This applies in particular to so-called echelle gratings which are used in high spectral orders. The grooves in echelle gratings have a step-like cross-sectional shape whereby one side is planarly reflecting. This implies that the highest intensity will be obtained for the wavelengths which, at diffraction, satisfy the grating equation at diffraction angles which at the same time satisfy the condition for reflection from the step surfaces. The widest commercially available echelle gratings are 400 mm wide and the widest echelle gratings that have ever been ruled are 624 mm wide. In addition, gratings of such a width require large and expensive optical components for collimating the incident light and for focusing the spectrum on the focal plane. Moreover, the focal length of these components must be very large (over 10 meters) in order to be able to obtain a sufficiently high linear dispersion so as to be able in practice to make use of the resolution of the grating.

The object of the present invention is to provide an apparatus for carrying out spectral analysis by means of which a high resolution can be achieved without using extremely wide gratings and large focal lengths. The invention is based on the following discussion.

For two grating surfaces arranged so that the dispersion in the individual grating surfaces co-acts, the angular dispersion from the second grating surface is $$\frac{d\beta_2}{d\lambda} = \frac{m_2}{d_2 \cos\beta_2} + \frac{m_1}{d_1 \cos\beta_1} \left( \frac{\cos\alpha_2}{\cos\beta_2} \right) \quad (5)$$

where m is the spectral order, d is the grating constant, $\alpha_1$, $\alpha_2$ is the angle of incidence and $\beta_1$, $\beta_2$ the diffraction angles for the respective grating surface.

If we assume that a beam incident on the first grating surface has a width of $w_1$ for a specific wavelength $\lambda$, the width $w_2'$ of the beam diffracted from the second grating surface is $$w_2' = w_1 \frac{\cos\beta_1 \cos\beta_2}{\cos\alpha_1 \cos\alpha_2} \quad (6)$$

The maximum resolvable angular difference is thus $$d\beta_2 = \frac{\lambda}{w_2'} \quad (7)$$

If this is substituted into equation (5), the spectral resolution for the combination of two grating surfaces with coacting dispersion is obtained $$R = w_1 \left\{ \frac{m_1}{d_1} \left( \frac{1}{\cos\alpha_1} \right) + \frac{m_2}{d_2} \left( \frac{\cos\beta_1}{\cos\alpha_1 \cos\alpha_2} \right) \right\} \quad (8)$$

If $W_1$, $W_2$ denote the width of the grating surfaces, we obtain $$W_1 = w_1 \cdot \frac{1}{\cos\alpha_1} \text{ and } W_2 = w_1 \frac{\cos\beta_1}{\cos\alpha_1 \cos\alpha_2} \quad (9)$$

If this is substituted into equation (8) and if we at the same time denote $N = W/d = $ total number of grooves in the illuminated part of the respective grating surface, we get $$R = m_1 N_1 + m_2 N_2 \quad (10)$$

This expression shows that the resolution of the two grating surfaces in the sum of the resolution of the individual grating surfaces when their dispersion is coacting. The same discussion, of course, applies to a plurality of grating surfaces. The apparatus according to the invention is characterized in that the diffraction grating means comprises at least two grating surfaces so arranged that the radiation, after diffraction from the first grating surface, is subject to diffraction also in the other grating surface or surfaces whereby the grating surfaces have such an orientation that the wavelength dispersion at diffraction from one grating surface acts to increase the wavelength dispersion at diffraction from the following grating surfaces. In the apparatus according to the invention, the same resolution as is obtained with one wide grating, is obtained with a plurality of smaller gratings for which the sum of the widths of said gratings equals the width of said grating. The invention also implies that the angular dispersion can be made to be so many times greater than the angular dispersion of one grating as the number of gratings used according to the invention. This implies that the high dispersion which is necessary for the utilization of the high resolution can be produced with focal lengths of the focusing optical components of 1 to 2 m only. Moreover, the invention implies that both the gratings and the other optical components included are considerably smaller and, accordingly, less expensive than in corresponding instruments provided with one grating.

One preferred embodiment of the invention is characterized in that the angle of incidence of the first grating surface is approximately equal to the angle of diffraction of the second grating surface, and that the angle of diffraction of the first grating surface is approximately equal to the angle of incidence of the second grating surface. Such a placement of the grating surfaces gives maximum total resolution in the apparatus when using equally large gratings.

Figure 2:
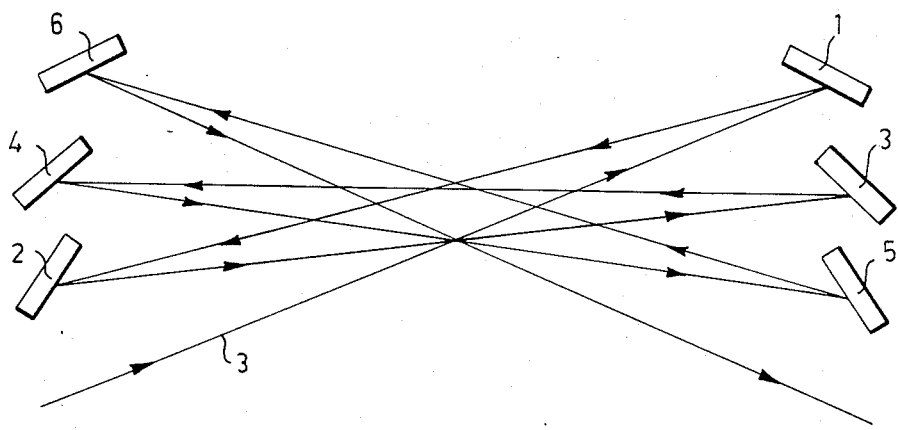
Figure 3:
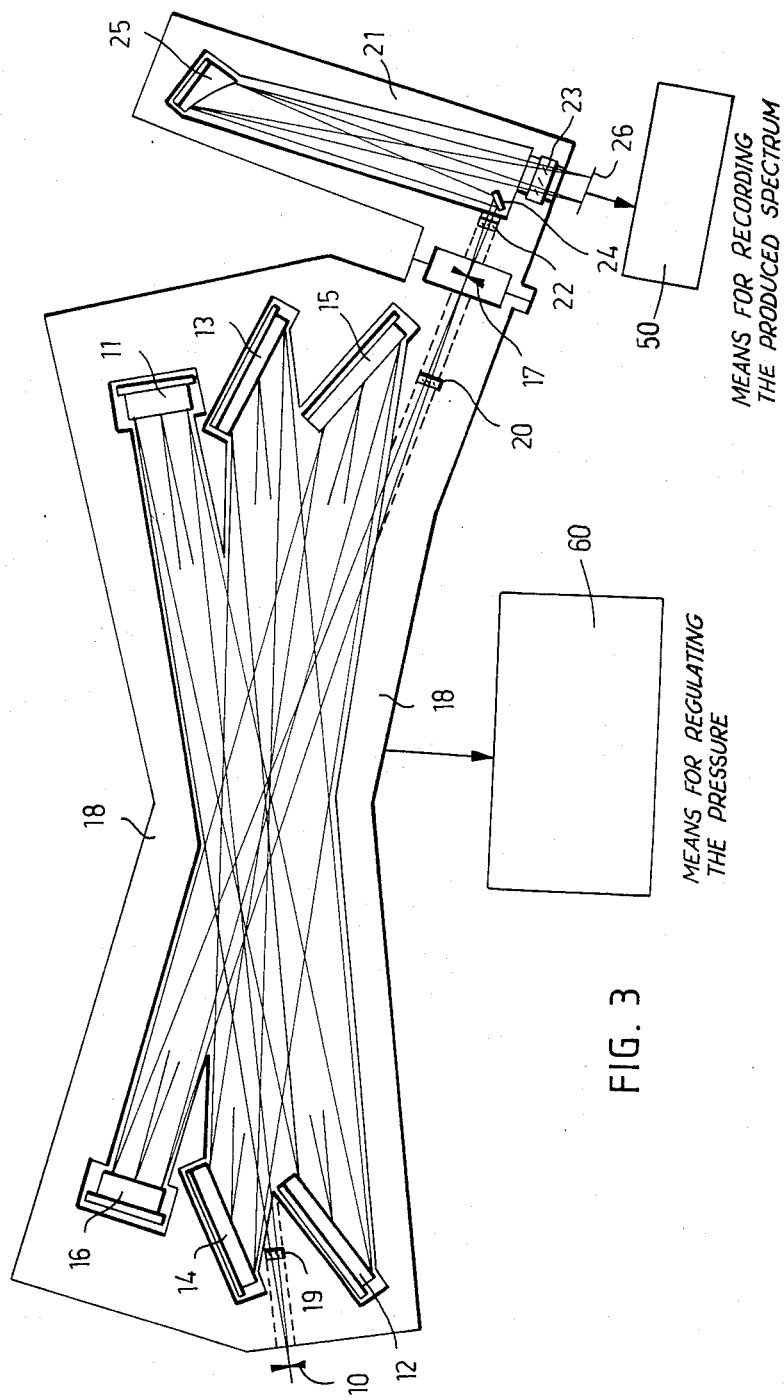

The apparatus according to the invention will be described in more detail in the following with reference to the accompanying drawing, in which FIG. 1 shows two grating surfaces arranged according to the invention, FIG. 2 shows an arrangement according to the invention with six grating surfaces, and FIG. 3 illustrates a spectral apparatus utilizing the arrangement according to the invention with 4 grating surfaces.

FIG. 1 shows two identical echelle gratings 1 and 2 arranged according to the invention. The incident beams 3 form an angle of incidence $\alpha_1$ with the grating surface normal, and the outgoing beams 5 form an angle of diffraction $\beta_2$ with the normal 4. In the example shown, the angle of incidence $\alpha_1$ of the grating 1 is equal to the angle of diffraction $\beta_2$ of the grating 2, while the angle of diffraction $\beta_1$ of the grating 1 is equal to the angle of incidence $\alpha_2$ of the grating 2.

The width of the incident beam 3 is denoted by $w_1$, and the beam that has been subject to diffraction in the grating 2 has in this case the same width which is denoted by $w_2'$.

FIG. 2 shows a schematical view of an arrangement according to the invention with six identical echelle gratings 1 to 6. The arrangement comprises three pairs of gratings according to FIG. 1, i.e. the pairs 1 and 2, 3 and 4, as well as 5 and 6. The gratings can preferably be enclosed in an air-tight container in which the gas pressure can be regulated by means for regulating the pressure 60 for scanning different wavelengths and which is provided with means for admitting the radiation into the container and means for recording the spectrum produced 50.

By means of the arrangement according to FIG. 2, a resolution is obtained which is the sum of the resolution of the individual gratings and which corresponds to the resolution of one grating the width of which is the sum of the widths of the individual gratings. Because the manufacturing costs for a grating rapidly increase as the width of the grating increases, it will be considerably cheaper to obtain the desired resolution using a plurality of gratings arranged according to the invention than using one wide grating only. In addition, it should be noted that it is technically impossible to make echelle gratings of any required large width, and the invention therefore permits resolutions which hitherto have been inconceivable. The gratings in FIGS. 1 and 2 can preferably be arranged so that reflection takes place at the step surfaces of the grooves at diffraction because the highest intensity yield is then obtained from the gratings. This occurs for one wavelength in each spectral order m, denoted $\lambda'_m$, for which the angle of incidence $\alpha$ and the angle of diffraction $\beta$ in the equation (1) simultaneously satisfy the condition $$\alpha + \beta = 2\theta \tag{11}$$

where $\theta$ denotes the angle between the normal to the grating surface and the normal to the step surfaces of the grooves. This angle is usually called the blaze angle of the grating.

It can be shown that if the angle between the incident beam 3 in FIG. 1 and the outgoing beam 5 is denoted by, the wavelength $\lambda'_m$ for which the reflection $2\delta$ takes place at the step surfaces of the grooves is determined by the equation $$\frac{m\lambda_m'}{d} = 2 n' \sin\theta \cos\delta \tag{12}$$

where, as previously, the quantity n denotes the refractive index. n is dependant on the gas pressure P which dependence is denoted by $n = n(P)$. By varying the pressure P, the refractive index n is varied and thereby also the wavelength $\lambda'_m$, as appears from the equation (12). In a spectral apparatus a certain wavelength range is generally required which the apparatus must be able to measure, which wavelength range is defined by a shortest wavelength $\lambda_{min}$ and a longest wavelength $\lambda_{max}$. With echelle gratings this means that said wavelength range is covered by utilizing diffraction in several spectral orders from the spectral order $m_{min}$ corresponding to $\lambda_{max}$ to the spectral order $m_{max}$ corresponding to $\lambda_{min}$, as appears from equation (1). In order to be able to measure said spectral range by means of pressure variation, the pressure is varied in a range from the pressure $P_1$ to the pressure $P_2$, by means for regulating the pressure 60, corresponding to a variation in the refractive index in the surrounding gas from $n(P_1)$ to $n(P_2)$. It can be shown that the required pressure variation for carrying out the measurement is determined by the requirement that the longest wavelength $\lambda_{max}$ in the spectral order $m_{min}$ at the pressure $P_1$ barely can be measured in the next higher spectral order $m_{min}+1$ at the pressure $P_2$. The equation (12) then gives that the required pressure range is determined by the equation $$n(P_2) = \left(\frac{m_{min} + 1}{m_{min}}\right) n(P_1) \tag{13}$$

If another wavelength dispersing means is included in the spectral apparatus in order to be able to distinguish the various spectral orders during recording, the entire spectral range from the wavelength $\lambda_{min}$ to the wavelength $\lambda_{max}$ can be measured when the pressure is varied from $P_1$ to $P_2$.

A spectral apparatus according to the invention is shown in FIG. 3. Therein 10 denotes the entrance slit. The radiation from this strikes the collimator mirror 11, whereafter the collimated radiation from this mirror in requence strikes the echelle gratings 12, 13, 14 and 15 which are arranged according to the invention. The radiation from the grating 15 is thereafter made to fall on the focusing mirror 16 which focuses the radiation to an image of the entrance slit 16 at the exit slit 17.

In FIG. 3, 18 denotes the walls of a pressure vessel in which windows 19, 20 for the incident and outgoing radiation are fastened. The radiation from the exit slit 17 is passed further into a second pressure vessel 21 provided with similar windows 22 and 23. The pressure vessel 21 communicates with the pressure vessel 18 so that the same pressure prevails in both vessels. The light is passed through the mirror 24 to a wavelength dispersing means 25 which also images the exit slit on the focal plane 26. At a certain pressure P in both vessels, the radiation from the exit slit 17 will contain only a number of discrete wavelengths, i.e. one wavelength from each spectral order. These wavelengths are determined by the relation $$\frac{m\lambda'_m}{N(P)} = C \tag{14}$$

where the constant C has a fixed value, i.e. the value $d(\sin\alpha + \sin\beta)$. The number of wavelengths $\lambda'_m$ is equal to the number of spectral orders, i.e. the difference $m_{max} - m_{min}$. The different wavelengths $\lambda'_m$ are imaged on the focal plane 26 at different positions which permit a separate measurement of the intensity of each of these wavelengths. As the pressure in the vessel is varied from the initial pressure $P_1$ to the final pressure $P_2$, the entire desired spectral range can be measured by recording, at each pressure value, the intensities of these wavelengths in the focal plane 26. During the measurement, all wavelengths at the entrance slit will have been subject to diffraction in the gratings 12 to 15 by utilizing their maximum intensity yield according to equation (12). In addition, all wavelengths $\lambda'_m$ will, because of the pressure vessel 18, during the entire pressure variation be imaged at the same positions in the focal plane 26, which facilitates the recording of their intensities.

The applicability of the present invention is given by the following example for the apparatus in FIG. 3.

The wavelength range is assumed to extend from $\lambda_{min} = 500$ nm to $\lambda_{max} = 800$ nm. The echelle gratings 12 to 15 are assumed to have 30 grooves/mm, the blaze angle $\theta = 62$ degrees and the width 160 mm. The focal lengths of the focusing mirror 16 and the collimator mirror 11 are each 1200 mm. The gratings are mounted so that the angle $\delta$ in equation (12) is 3.5 degrees implying that $\alpha = 65.5$ degrees, $\beta = 58.5$ degrees for the gratings 12 and 14, while $\alpha = 58.5$ degrees, $\beta = 65.5$ degrees for the gratings 13 and 15. The desired wavelength range is covered by 44 spectral orders from $m_{max} = 117$ to $m_{min} = 73$. The maximum achievable resolution will then be 1,540,000 at 800 nm, which is obtained with the width 13 µm of the exit slit 17. If the gas in the vessels of the apparatus is air and the initial pressure $P_1 = 100$ kPa corresponding to $n(P_1) = 1.000275$, $n(P_2) = 1.0137$ is obtained from equation (13) implying that the final pressure $P_2 = 5000$ kPa.

As appears from FIG. 1, the normals 4 of the grating surfaces 1, 2 cross each other. This mutual position of the grating surfaces gives the best results, but also an embodiment where the normals coincide with each other is conceivable. Instead of echelle gratings, it is possible to use other reflection gratings and also transmission gratings. It is further possible to use gratings having a surface shape other than planar, as well as gratings produced holographically. The invention also includes such mountings of the gratings in which the incident and outgoing radiation of one or more gratings form an angle with the plane which is perpendicular to the grooves in the grating and contains the grating normal.

I claim:

1. An apparatus for carrying out spectral analysis comprising means for admitting radiation into the apparatus, means for recording a produced spectrum and an even number of echelle gratings which are identical in pairs and each grating of the pairs having a grating surface for dispersing incident radiation such that the wavelength dispersion due to diffraction from one echelle grating acts to increase the wavelength dispersion due to diffraction from a remaining echelle grating of each of said pairs, the gratings of each of said pairs having such an orientation that the angle of incidence of a first grating of each pair is approximately equal to the diffraction angle of a second grating a said pair, and that the diffraction angle of the first grating is approximately equal to the angle of incidence of second grating, the gratings being arranged in an air-tight container provided with means for regulating the gas pressure in the container for scanning the spectrum within a pressure range to give spectral continuity for wavelengths diffracted in higher spectral order number than a spectral order number corresponding to the longest wavelength wherein said corresponding spectral order number is $m_{min}$.

2. An apparatus according to claim 1, characterized in that the grating surfaces (1-6, 12-15) are so arranged with respect to each other that their normals (4) in a direction outwards from the grating surfaces cross each other or coincide with each other.

3. An apparatus according to claim 1, wherein the apparatus contains an exit slit from which the radiation from the grating pairs is passed to a wavelength dispersing optical means through which the wavelengths included in the radiation corresponding to the spectral orders of the gratings are separated from each other and focused in a focal plane, whereby said dispersing optical means is orientated so that the wavelength dispersion from the dispersing optical means takes place approximately in the same plane as the wavelength dispersion of the gratings.

4. An apparatus according to claim 3, wherein said wavelength dispersing optical means is enclosed in a gas-tight container provided with means for regulating the pressure in the container.

* * * * *